(12) United States Patent
Hasse

(10) Patent No.: US 9,485,327 B2
(45) Date of Patent: Nov. 1, 2016

(54) MOTOR VEHICLE HAVING A VEHICLE COMMUNICATION BUS AND METHOD FOR GENERATING BUS MESSAGES

(71) Applicant: AUDI AG, Ingolstadt (DE)

(72) Inventor: Andre Hasse, Gachenbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/768,187

(22) PCT Filed: Jan. 24, 2014

(86) PCT No.: PCT/EP2014/000180
§ 371 (c)(1),
(2) Date: Aug. 14, 2015

(87) PCT Pub. No.: WO2014/124732
PCT Pub. Date: Aug. 21, 2014

(65) Prior Publication Data
US 2015/0381765 A1    Dec. 31, 2015

(30) Foreign Application Priority Data

Feb. 15, 2013    (DE) ........................ 10 2013 002 647

(51) Int. Cl.
*H04L 12/40*    (2006.01)
*H04L 29/08*    (2006.01)
*H04L 12/875*    (2013.01)

(52) U.S. Cl.
CPC ......... *H04L 67/325* (2013.01); *H04L 12/4015* (2013.01); *H04L 12/40019* (2013.01);
(Continued)

(58) Field of Classification Search
CPC ........... H04L 67/325; H04L 12/40019; H04L 12/4015; H04L 47/568; H04L 67/125; H04L 2012/40234; H04L 2012/40273
See application file for complete search history.

(56) References Cited

U.S. PATENT DOCUMENTS

| 4,503,495 A | * | 3/1985 | Boudreau | ............. G06F 11/349 |
| | | | | 710/241 |
| 4,511,960 A | * | 4/1985 | Boudreau | ................. G06F 9/35 |
| | | | | 711/217 |

(Continued)

FOREIGN PATENT DOCUMENTS

| DE | 19963610 | 11/2000 |
| DE | 10000302 | 7/2001 |

(Continued)

OTHER PUBLICATIONS

IEEE Std 802.11p (tm)-2010, 51pages, available online @ https://www.ietf.org/mail-archive/web/its/current/pdfqf992dHy9x.pdf, last accessed Jun. 11, 2016.*

(Continued)

*Primary Examiner* — Behrang Badii
*Assistant Examiner* — Daniel L Greene
(74) *Attorney, Agent, or Firm* — Staas & Halsey LLP

(57) ABSTRACT

A motor vehicle has a master bus device that is designed to use a vehicle communication bus of the motor vehicle to exchange messages with slave bus devices. A transmission device of the master bus device cyclically exchanges the messages with the slave bus devices on the basis of a schedule For making efficient use of the vehicle communication bus by the schedule-controlled master bus device, the transmission device is designed to receive a diagnosis request signal via a data input that is different than the bus port of the master bus device and to take the diagnosis request signal as a basis for interrupting the cyclic processing of the schedule and to exchange at least one special message that is different than the messages stipulated in the schedule with at least one of the slave bus devices and then to continue the processing of the schedule.

20 Claims, 1 Drawing Sheet

(52) U.S. Cl.
CPC .......... *H04L47/568* (2013.01); *H04L 67/125*
(2013.01); *H04L 2012/40234* (2013.01); *H04L 2012/40273* (2013.01)

(56) References Cited

U.S. PATENT DOCUMENTS

| | | | | |
|---|---|---|---|---|
| 5,511,164 | A * | 4/1996 | Brunmeier | G06F 11/0793 714/15 |
| 5,596,716 | A * | 1/1997 | Byers | G06F 11/0721 714/47.1 |
| 5,680,537 | A * | 10/1997 | Byers | G06F 11/2268 714/5.11 |
| 5,784,382 | A * | 7/1998 | Byers | G11C 29/20 714/718 |
| 5,784,393 | A * | 7/1998 | Byers | G06F 11/10 714/56 |
| 6,122,704 | A * | 9/2000 | Hass | G01K 1/028 374/E1.006 |
| 6,360,152 | B1 | 3/2002 | Ishibashi et al. | |
| 6,665,601 | B1 | 12/2003 | Nielsen | |
| 6,944,906 | B2 * | 9/2005 | Moein | B60S 1/0814 15/250.3 |
| 8,687,520 | B2 * | 4/2014 | Van Wageningen | H04J 3/0676 370/254 |
| 2003/0070019 | A1 | 4/2003 | Dalakuras et al. | |
| 2003/0131171 | A1 | 7/2003 | Weigl et al. | |
| 2006/0192671 | A1 | 8/2006 | Isenmann et al. | |
| 2007/0083787 | A1 | 4/2007 | Weigl et al. | |
| 2008/0273527 | A1 | 11/2008 | Short et al. | |
| 2009/0307400 | A1 | 12/2009 | Machauer et al. | |
| 2011/0301805 | A1 | 12/2011 | Avian | |

FOREIGN PATENT DOCUMENTS

| | | |
|---|---|---|
| DE | 10147445 | 4/2003 |
| DE | 102005008488 | 9/2006 |
| DE | 102006032217 | 1/2008 |
| DE | 102008030162 | 12/2009 |
| DE | 10 2013 002 647.4 | 2/2013 |
| WO | 01/50677 | 7/2001 |
| WO | PCT/EP2014/000180 | 1/2014 |

OTHER PUBLICATIONS

German Office Action for German Priority Patent Application No. 10 2013 002 647.4, issued on Oct. 14, 2013, 6 pages.
German Decision to Grant for German Priority Patent Application No. 10 2013 002 647.4, issued on Feb. 4, 2014, 5 pages.
Letters Patent for German Priority Patent Application No. 10 2013 002 647, issued May 22, 2014, 9 pages.
English Language International Search Report for PCT/EP2014/000180, mailed Mar. 18, 2014, 2 pages.
WIPO English Language Translation of the International Preliminary Report on Patentability for PCT/EP2014/000180, downloaded from WIPO website on Aug. 17, 2015, 5 pages.

* cited by examiner

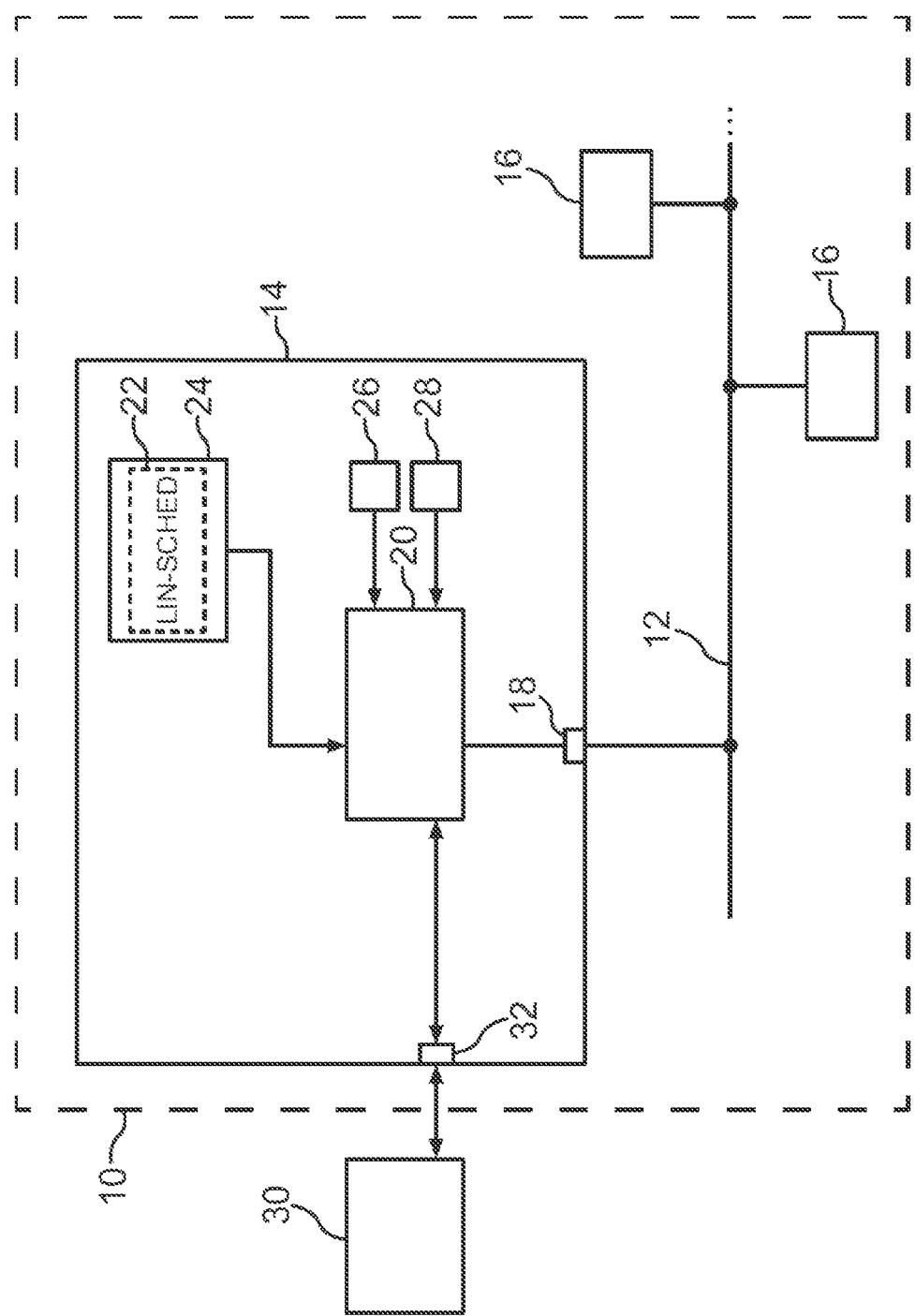

MOTOR VEHICLE HAVING A VEHICLE COMMUNICATION BUS AND METHOD FOR GENERATING BUS MESSAGES

CROSS REFERENCE TO RELATED APPLICATIONS

This application is based on and hereby claims priority to International Application No. PCT/EP2014/000180 filed on Jan. 24, 2014 and German Application No. 10 2013 002 647.4 filed on Feb. 15, 2013, the contents of which are hereby incorporated by reference.

BACKGROUND

Described below is a bus device for a motor vehicle that is designed, as a master bus device, to use a vehicle communication bus of the motor vehicle to exchange messages with slave bus devices. The master bus device is designed particularly for a LIN bus (LIN—Local Interconnect Network). Also described are a corresponding motor vehicle and a method for operating a master bus device on a vehicle communication bus of a motor vehicle.

In a LIN bus, the master bus device sends messages to the remainder of the bus subscribers, that is to say the slave bus devices, in prescribed timeslots and in a prescribed order. The message type is also stipulated. In this case, message type means that a message is sent to a quite particular addressee using a quite particular request. Thus, a message may comprise, by way of example, a control signal to a quite particular slave bus device, such as an activation signal for a sliding roof controller. Alternatively, a message may comprise a request to a slave bus device for it to transmit data of a particular type, that is to say a current temperature, for example. On the basis of the LIN standard, the message in this case comprises the message header, transmitted by the master bus device, with the transmission request, to which message header the slave bus device then appends the requested data.

The specifications pertaining to the transmission times and the message type are obtained from a schedule that is stored in a memory of the master bus device. The schedule is cyclically processed by the master bus device, i.e. following termination of the last step of the schedule the master bus device starts from the beginning again in the schedule. The component of the master bus device that cyclically processes the schedule and exchanges the messages with the slave bus devices is referred to as a transmission device of the master bus device in this case.

The schedule needs to be stipulated and stored in the memory at the time of development of the master bus device. In this case, it needs to take account of all the situations that can arise in a motor vehicle in the course of operation thereof. During normal operation of the motor vehicle, when a driver is using the motor vehicle for travel by it, for example, the master bus device exchanges messages relating to the operation of the motor vehicle with the slave bus devices. If a slave bus device is a sensor, for example, appropriate messages can be used to transmit sensor data from the slave bus device to the master bus device. If the slave bus device is an actuator, that is to say, by way of example, a controller with a motor connected thereto for a sliding roof, for example, the master bus device can use an appropriate message to send a control command for activation.

Besides such messages for normal operation, it must alternatively be possible, for maintenance work, for the master bus device to be able to exchange messages with the slave bus devices for diagnosis or reconfiguration of the slave bus devices. Therefore, the schedule of the master bus device usually has a few timeslots reserved in the schedule for such diagnosis communication with the slave bus device. These timeslots are not used during normal operation, i.e. the master bus device has a respective transmission pause during normal operation of the motor vehicle. Only in the event of maintenance work in a workshop does the master bus device use the timeslot for diagnosis communication.

DE 10 2006 032 217 A1 discloses a method for operating a LIN bus in which an alternative communication protocol is tunneled through the LIN protocol. As a result, LIN messages can each be used to transport sections of a data stream that needs to be transmitted via the vehicle communication bus on the basis of a diagnosis protocol during a diagnosis session.

SUMMARY

Described below is a method making efficient use of a vehicle communication bus by a schedule-controlled master bus device.

The master bus device described herein is a development of a master bus device for a motor vehicle that is designed to use a vehicle communication bus of the motor vehicle to exchange messages with slave bus devices of the motor vehicle. A schedule in the master bus device stipulates, in the manner described, what messages the master bus device exchanges with the slave bus devices during normal operation. The schedule is cyclically processed by a transmission device of the master bus device, which means that the transmission device takes the schedule as a basis for repeatedly exchanging messages of the same type with the slave bus devices via the communication bus in predetermined timeslots. The master bus device is particularly a master bus device for a LIN bus, i.e. the messages exchanged via the LIN bus are then LIN messages, as are known per se from the LIN standard.

The transmission device is additionally designed to use a data input to receive a diagnosis request signal, which may come from a vehicle tester, for example. By way of example, the data input may accordingly be a port for a diagnosis device or a tester that can be connected to the motor vehicle via the port. In general terms, the data input is different than the bus port of the master bus device.

Based on the diagnosis request signal, the cyclic processing of the schedule by the transmission device is then at least once interrupted. Thus, the transmission device then exchanges no further messages in the manner prescribed by the schedule. Instead, provision is made for the transmission device to exchange at least one special message with at least one of the slave bus devices upon every interruption. In this case, the at least one special message is different than the messages stipulated in the schedule. Following the exchange of the at least one special message during an interruption, the schedule is then reactivated, i.e. the cyclic processing of the schedule is continued by the transmission unit. These operations performed by the transmission unit of the master bus device correspond to the method described herein. In particular, provision may be made for only one or two special messages to be produced for every interruption by a diagnosis request signal.

The method has the advantage that the schedule for the master bus device now no longer needs to keep timeslots both for normal operation and for diagnosis communication in a workshop so that messages of the appropriate message type can be sent via the vehicle communication bus. Instead, the schedule may now be designed completely, but at least overwhelmingly, for normal operation of the motor vehicle, i.e. for operation in which a driver uses the motor vehicle. In other words, the schedule may completely or at least overwhelmingly comprise only messages relating to the operation of the motor vehicle during normal operation. In this way, a larger bandwidth is obtained for the transmission of the messages for normal operation. In this case, the messages provided for normal operation of the motor vehicle are also referred to as function messages in connection with the LIN standard. In the case of a LIN bus, there thus may be exclusively function messages provided in the schedule.

If it is then necessary to use the master bus device to exchange a diagnosis message with one of the slave bus devices via the vehicle communication bus, this can be done by sending a special message. In this case, a further advantage of the method is that the special messages can be inserted into the data traffic of the vehicle communication bus at any time at arbitrary instants. It is merely necessary in this case for a diagnosis request signal to be produced at the data input to prompt the transmission device to transmit a special message.

The special message may be a diagnosis request as is necessary for a function check, for example, when maintaining the motor vehicle or else when manufacturing the motor vehicle. By way of example, such a diagnosis request can query a serial number of a slave bus device, a software version of a piece of operating software, a hardware number of a device component or else a set configuration of the slave bus device. The special message may also comprise configuration data for a slave bus device, as a result of which the special messages can also be used to configure a slave bus device. The diagnosis request signal may also immediately signal those diagnosis messages that need to be transmitted to a slave bus device via the communication bus. As a result of the diagnosis request signal, the master bus device thus receives via its data input one or more diagnosis messages that need to be transmitted via the communication bus as special messages.

A further advantage is obtained when, during a respective interruption in the normal schedule, the at least one special message is transmitted by a special schedule. It is then thus necessary only to change over from the normal schedule (also referred to as the applicative schedule) to a special schedule. In this case, the transmission device is designed to execute the special schedule only once in each case. It then continues the processing of the normal schedule. After a predetermined period of time, the normal schedule is then interrupted again and the special schedule is executed once again to transmit one or more special messages again. This is repeated by the transmission device until all the diagnosis requests from the diagnosis request signal have been transmitted as special messages. In this case, the master may implicitly recognize that special messages need to be transmitted to a LIN slave, for example, when a diagnosis request signal is received at the data input. The schedule changeover is then also controlled correspondingly implicitly, i.e. no additional control signals need to be transmitted via the data input of the master bus device. This would require additional bandwidth on the communication link. This can advantageously be dispensed with if the changeover of the schedule is derived implicitly from the data input.

There may also be a plurality of special schedules provided. In that case, a diagnosis message allows, by way of example, the initiation of a self-diagnosis in a slave bus device by the transmission device and the use of a first special schedule in the manner described for the purpose of transmitting this diagnosis message. After the self-diagnosis in the slave bus device has concluded, a second special schedule can then be used by the transmission device to read diagnosis results from the slave bus device. In this case too, the transmission device is then designed to receive a diagnosis response, which is part of the diagnosis result, from the slave bus device via the vehicle communication bus during a respective interruption in the normal schedule by once processing the second special schedule. In this case too, the normal schedule is again reinterrupted in each case after a predetermined period of time and the second special schedule is executed once during each interruption until the diagnosis results in the master bus device are complete.

The transmission device may be designed to continue the processing of the schedule at the location in the schedule at which the processing has been interrupted by the diagnosis request signal. This results in the advantage that the motor vehicle can continue to be operated normally. In comparison with the duration of a single cyclic execution of the schedule, there is merely a resultant delay of no more than 10 percent, for example, when the special message is additionally exchanged. This normally does not cause significant impairment of the operation of the motor vehicle. This is the technically most useful application, but it is technically also possible for the interrupted schedule to be repeatedly started from the beginning.

The motor vehicle described below has a vehicle communication bus to which a master bus device is connected. The motor vehicle described below has the advantage that its vehicle communication bus can be used during normal operation of the motor vehicle to exchange the messages required for normal operation with a relatively large bandwidth (that is to say function messages, for example), and it is still possible for diagnosis communication or configuration of slave bus devices to take place via the vehicle communication bus at any time.

The developments of the method have already been described in connection with the developments of the master bus device.

BRIEF DESCRIPTION OF THE DRAWINGS

These and other objects and advantages of the present invention will become more apparent and more readily appreciated from the following description of a specific exemplary embodiment, taken in conjunction with the accompanying drawings of which:

The FIGURE schematically shows a motor vehicle, which may be a car, for example.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the FIGURE, motor vehicle 10 has a vehicle communication bus 12, which may be a LIN bus, for example, that is used to transmit messages on the basis of the LIN standard (that is to say LIN messages). The communication on the vehicle communication bus, subsequently bus 12 for short, is controlled in the motor vehicle 10 by a master bus device, or bus master 14 for short. In this case, the bus master 14 exchanges the messages with slave bus devices, or slave devices 16 for short. To this end, the devices are all connected to the bus 12. The FIGURE shows only two slave devices 16, but more slave devices or else just one slave device may be connected. By way of example, a slave device 16 may be a circuit having a sensor, for example a temperature sensor, or may be an actuator, for example a motor controller for a window lifter. Alternatively, a slave device 16 may be a controller with a dedicated piece of operating software.

The bus master 14 is connected to the bus 12 via a bus port 18. The messages that the bus master 14 exchanges with the slave devices 16 via the bus 12 can be produced by a transmission device 20 of the bus master 14. In this case, a message may be a transmission message that the bus master 14 uses to transmit data to one of the slave devices 16. A message may also be a reading message that the bus master 14 uses to prompt one or more of the slave devices 16 in the manner described at the outset to send data to the bus master 14 via the bus 12. By way of example, the transmission device 20 may comprise a microcontroller and/or a program module for the microcontroller.

The bus master 14 repeatedly exchanges messages of a predetermined type with the slave devices 16 cyclically in a prescribed order and at prescribed instants. By way of example, the bus master 14 can thus repeatedly ask a slave device having a temperature sensor, cyclically at quite particular instants, to send a current temperature value to the bus master 14. If a message of a particular type needs to be sent at a particular instant or for a particular time window (also called a timeslot), there are no data available therefor, however, and a transmission pause occurs on the bus 12.

The transmission device 20 has a control unit. What messages need to be output when by the transmission device 20 on the bus port 18 is stipulated by a schedule. The bus device 14 has an operating schedule 22. The operating schedule 22 is designed for an application mode of the master device 14 and stipulates an order and clocking (transmission timeslots) for messages, as are suitable for interchanging the sensor data or control data, as required for smooth operation of the motor vehicle 10, with the slave devices 16 during normal operation of the motor vehicle, that is to say during a trip, for example. In this case, the schedule 22 may be optimized such that no messages at all, i.e. no timeslots at all, are reserved for such messages as do not need to be exchanged during normal operation of the motor vehicle, that is to say diagnosis messages or configuration messages for setting the operating behavior of the slave devices 16, for example.

The schedule 22 is stored in a memory 24, for example in a flash memory, EEPOM or a hard disk. The transmission device 20 is coupled to the memory 24.

To explain the exemplary embodiment further, it is assumed that the motor vehicle 10 has been taken to a workshop to check or reset the operation of the slave devices 16. This requires the exchange of special messages via the bus 12, that is to say messages that do not occur during normal operation of the motor vehicle 10. By way of example, a driver of the motor vehicle 10 may have established that he has difficulties with the operation of one of the slave devices 16, for example the operation of a controller for a sliding roof. By way of example, it may therefore be necessary to use the bus master 14 to query a software version of a piece of operating software for one of the slave devices 16 via the bus 12. The motor vehicle 10 may also be a prototype that is in development. So as then to improve control programs of the slave devices 16 for everyday suitability, for example, the motor vehicle 10 is regularly taken to the workshop after trial runs to reconfigure the slave devices 16. To this end, configuration data need to be transmitted from the bus master 14 to the slave devices 16 via the bus 12. Another scenario may be the configuration and testing of the slave devices 16 during manufacture of the motor vehicle 10. In this case too, a workshop may require bus communication that differs from the bus communication during normal operation.

The schedule 22 may nevertheless be designed such that it does not take account of diagnosis communication. The bus master 14 uses the schedule 22 for normal operation of the motor vehicle 10. Only when a diagnosis message needs to be sent from the bus master 14 to a slave device 16 via the bus 12 does the bus master switch to a schedule 26 that allows a diagnosis message to be sent. Thereafter, the schedule 22 for normal operation is continued at the location at which it was interrupted. This is repeated at a user-definable interval of time so as to be able to transmit the entire content of a diagnosis request. If the diagnosis request has been sent completely, the bus master 14 switches to a schedule 28 that allows a diagnosis message to be received. Thereafter, the schedule 22 for normal operation is continued again at the location at which it was interrupted. This is repeated at a user-definable interval of time to transmit the entire content of the diagnosis response. The schedule 26 for sending and the schedule 28 for receiving the diagnosis messages may likewise be stored in a memory of the bus master 14 or outside the bus master 14 in the same way as the schedule 22 in a memory 24. The schedules 22, 26, 28 may also be stored in the memory 24 together. The schedules 26, 28 are special schedules for the purposes of the invention.

In order to interrupt the transmission device 20 in the processing of the schedule 22 and to send a diagnosis request to one of the slave devices 16 via the bus 12, provision may be made for an appropriate tester or controller 30 to be connected to the motor vehicle 10. The controller 30 may then be coupled to the transmission device 20 via a data input 32 of the bus master 14. The controller 30 can use the data input 32 to transmit data with a diagnosis request to the transmission device 20 and thereby to prompt changeover of the schedules. If a timeslot is then provided for a diagnosis request on the basis of the schedule 26, the transmission device 20 can transmit the diagnosis request on the basis of the received data. The diagnosis responses received according to the schedule 28, for example, can then likewise be transmitted from the transmission device 20 to the controller 30 via the data connection 32, so that an operator (not shown), for example, can use the diagnosis data in the controller 30.

The example shows how the schedule 22 for normal operation of a motor vehicle can use the bandwidth of a bus 12, particularly of a LIN bus, completely for messages that are required for the actual operation of the motor vehicle 10. Nevertheless, diagnosis communication is possible. The bandwidth that is available in this case for diagnosis communication and the resultant delay in the function messages on account of the interruption in the schedule 22 can be set without restriction by the interval of time between the activation of the diagnosis schedules 26, 28. According to the method, provision may also be made here for the normal schedule 22 (also called the applicative schedule) to be interrupted first of all with a request for a diagnosis to a slave, e.g. by the schedule 26. When this request has been sent completely, the applicative schedule is then interrupted with headers for the diagnosis response from the slave, e.g.

by the schedule 28. Only when the response has been received completely does the applicative schedule continue to run without interruption.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A master bus device for a motor vehicle that is designed to access a vehicle communication bus of the motor vehicle via a bus port to exchange messages with slave bus devices of the motor vehicle based on a main schedule in the master bus device that stipulates what messages the master bus device exchanges with the slave bus devices, comprising:
   a transmission device to
      perform cyclic processing of the main schedule to exchange the messages stipulated by the main schedule with the slave bus devices;
      receive a diagnosis request signal via a data input that is different from the bus port of the master bus device;
      take the diagnosis request signal as a basis for a transmission interruption of the main schedule, to exchange at least one special message that is different from the messages stipulated in the main schedule, the at least one special message being exchanged with at least one slave bus device;
      interrupt, after the transmission interruption, the main schedule with a reception interruption to receive at least one diagnosis response from the at least one slave bus device via the vehicle communication bus, the reception interruption being based on a special reception schedule; and
      process the main schedule after the transmission interruption and reception interruption.

2. The master bus device as claimed in claim 1, wherein the vehicle communication bus with which the master bus device exchanges the messages is a Local Interconnect Network (LIN) bus and each of the messages and the at least one special message is a LIN message.

3. The master bus device as claimed in claim 1, wherein the main schedule is processed by the master bus device during normal operation of the motor vehicle while a driver uses the motor vehicle, and during the normal operation the main schedule contains substantially only the messages relating to operation of the motor vehicle.

4. The master bus device as claimed in claim 1, wherein
   the diagnosis request signal contains data selected from the group consisting of diagnosis request data and configuration data, and
   during the transmission interruption, each special message contains at least a portion of the data contained in the diagnosis request signal.

5. The master bus device as claimed in claim 1, wherein during the transmission interruption, the transmission device transmits the at least one special message by processing a special transmission schedule.

6. The master bus device as claimed in claim 1, wherein after the transmission interruption and reception interruption, the transmission device continues the cyclic processing of the main schedule at a location in the main schedule at which the processing was interrupted.

7. The master bus device as claimed in claim 1, wherein
   the main schedule is processed by the master bus device during normal operation of the motor vehicle while a driver uses the motor vehicle,
   the diagnosis request signal contains data selected from the group consisting of diagnosis data and configuration data, and
   the main schedule has no time slots reserved for transferring the data contained in the diagnosis request signal.

8. The master bus device as claimed in claim 7, wherein during the transmission interruption, each special message contains at least a portion of the data contained in the diagnosis request signal.

9. The master bus device as claimed in claim 7, wherein during the transmission interruption, the transmission device transmits the at least one special message by processing a special transmission schedule.

10. The master bus device as claimed in claim 7, wherein
    a first transmission interruption is followed by a second transmission interruption,
    the second transmission interruption is followed by the reception interruption, and
    the main schedule is processed between the first and second transmission interruptions.

11. A motor vehicle, comprising:
    a vehicle communication bus;
    slave bus devices connected to the vehicle communication bus; and
    a master bus device, connected to the vehicle communication bus via a bus port to exchange messages with the slave bus devices to
       perform cyclic processing of a main schedule in the master bus device that stipulates what messages the master bus device exchanges with the slave bus devices,
       receive a diagnosis request signal via a data input that is different from the bus port of the master bus device,
       take the diagnosis request signal as a basis for a transmission interruption of the cyclic processing of the main schedule, to exchange at least one special message that is different from the messages stipulated in the main schedule, the at least one special message being exchanged with at least one slave bus device,
       interrupt, after the transmission interruption, the main schedule with a reception interruption, to receive a diagnosis response from the at least one slave bus device via the vehicle communication bus based on a special reception schedule, and
       process the main schedule after the transmission interruption and reception interruption.

12. The motor vehicle as claimed in claim 11, wherein the main schedule is processed by the master bus device during normal operation of the motor vehicle while a driver uses the motor vehicle, and during the normal operation the main schedule contains substantially only the messages relating to operation of the motor vehicle.

13. The motor vehicle as claimed in claim 11, wherein during normal operation of the motor vehicle while a driver uses the motor vehicle, the main schedule has no time slots reserved for transferring maintenance messages.

14. The motor vehicle as claimed in claim 11, wherein each special message contains at least a portion of request data contained in the diagnosis request signal and/or at least a portion of configuration data contained in the diagnosis request signal.

15. The motor vehicle as claimed in claim 11, wherein the transmission device transmits the at least one special message during a respective interruption in the main schedule by processing a special transmission schedule.

16. A method for operating a master bus device, connected via a bus port to a vehicle communication bus of a motor vehicle, based on a main schedule in the master bus device that stipulates what messages the master bus device exchanges with slave bus devices of the motor vehicle via the vehicle communication bus, the method comprising:

cyclic processing of the main schedule by a transmission device of the master bus device to produce messages on the vehicle communication bus based on the main schedule;

receiving a diagnosis request signal via a data input that is different from the bus port of the master bus device;

taking the diagnosis request signal as a basis for a transmission interruption of the main schedule and exchanging at least one special message, different from the messages stipulated in the main schedule, the at least one special message being exchanged with at least one slave bus device;

interrupting, after the transmission interruption, the main schedule with a reception interruption to receive at least one diagnosis response from the at least one slave bus device via the vehicle communication bus, the reception interruption being based on a special reception schedule;

processing of the main schedule, after the transmission interruption and reception interruption, including producing the messages on the communication bus stipulated in the main schedule.

17. The method as claimed in claim 16, wherein the cyclic processing of the main schedule by the master bus device occurs during normal operation of the motor vehicle while a driver uses the motor vehicle, and during the normal operation the main schedule contains substantially only the messages relating to operation of the motor vehicle.

18. The method as claimed in claim 16, wherein during normal operation of the motor vehicle while a driver uses the motor vehicle, the main schedule has no time slots reserved for transferring maintenance messages.

19. The method as claimed in claim 16, wherein each special message contains at least a portion of request data contained in the diagnosis request signal and/or at least a portion of configuration data contained in the diagnosis request signal.

20. The method as claimed in claim 16, wherein the exchanging of the at least one special message occurs during the transmission interruption in the main schedule by processing a special transmission schedule.

* * * * *